INVENTOR.
FRANK R. OGILVIE
BY
*Bernard I. Brown*
ATTORNEY

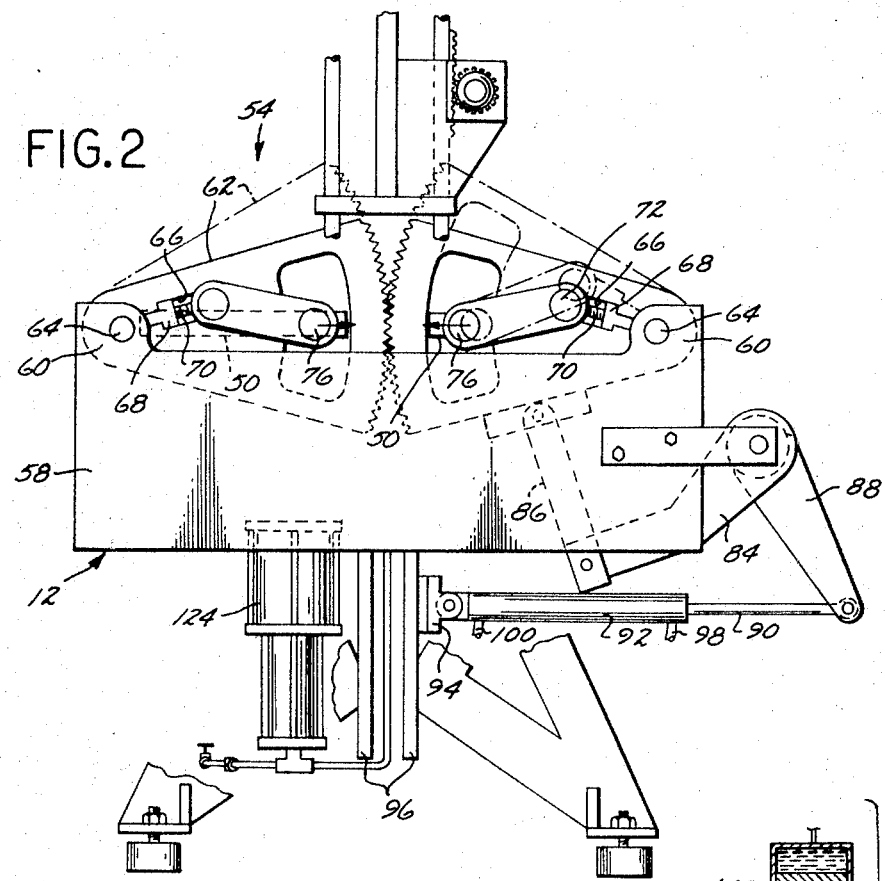
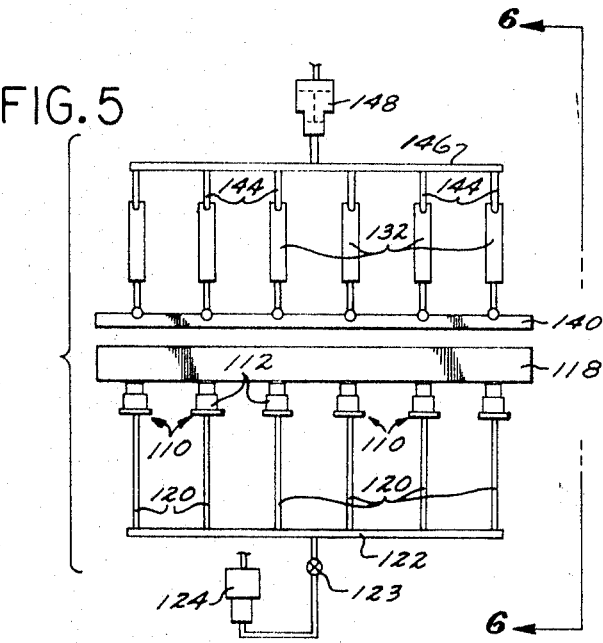
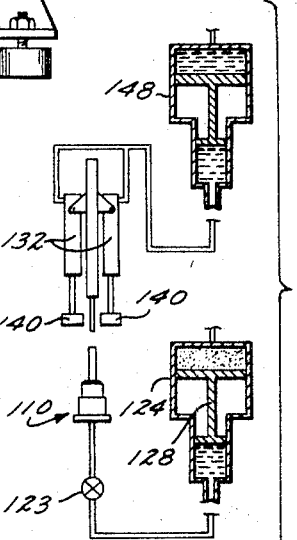

INVENTOR.
FRANK R. OGILVIE
BY
ATTORNEY

INVENTOR.
FRANK R. OGILVIE
BY
ATTORNEY

INVENTOR.
FRANK R. OGILVIE
BY
ATTORNEY

United States Patent Office 3,461,711
Patented Aug. 19, 1969

3,461,711
CORRUGATING METHOD AND APPARATUS
Frank R. Ogilvie, 203 S. Elwood,
Glendora, Calif. 91740
Filed Sept. 8, 1964, Ser. No. 394,923
Int. Cl. B21d 13/02, 5/01
U.S. Cl. 72—383  8 Claims

ABSTRACT OF THE DISCLOSURE

A sheet corrugating machine having a pair of spaced parallel forming members to which the work sheet is clamped and a forming bar which deforms the work sheet between the forming members to form a corrugation in the sheet. During the formation of each corrugation, the forming members move, inwardly toward the forming bar as the latter enters between the members and at a rate controlled by coacting means on the forming bar and forming members to avoid stretching of the work sheet.

---

The present invention relates generally to the art of cold forming sheet material, such as metal and plastic; more particularly, the invention relates to a novel method of and machine for cold forming corrugations in sheet material.

Various corrugating methods and machines have heretofore been devised. Corrugating methods and machines, however, have been deficient in that they often mar the surface of the workpiece, that is, the sheet material being corrugated, and/or produce undesirable stresses in the workpiece. For example, the existing corrugating machines are prone to abrade, scuff, scratch, rub, or otherwise mark the surface of the workpiece during the corrugating operation. Further, the corrugating methods embodied in many of the machines are such that the workpiece is drawn or compressed during the corrugating operation, thereby creating undesirable stresses and visual surface imperfections in the workpiece. These deficiencies of the existing corrugating methods and machines preclude, in most cases, their use for corrugating prefinished workpieces, that is sheet material which has been painted, anodized, or otherwise surface coated prior to the corrugating operation.

This inability of the existing corrugating machines to operate on a prefinished workpiece constitutes a distinct disadvantage of the machines. The reason for this is that the time and cost involved in painting, anodizing, or otherwise coating or surface finishing a flat workpiece, such as a flat sheet of metal, for example, is substantially less than the time and cost involved in surface finishing the same workpiece after it has been corrugated. Accordingly, there is a definite need for a corrugating machine which possesses the capability of corrugating a prefinished workpiece without abrading, scuffing, scratching, rubbing, or otherwise marring the workpiece, and without drawing, compressing, or otherwise creating undesirable stresses in the workpiece, during the corrugating operation.

It is therefore an object of the present invention to provide an improved method of and machine for corrugating sheet material.

An object of this invention is the provision of a corrugating method and machine which do not mar or undesirably stress the workpiece during the corrugating operation.

An object of the invention is to provide an improved corrugating method and machine of the character described which are uniquely capable of operating on a workpiece without in any way adversely affecting the surface of the workpiece, whereby the latter may be surface finished prior to corrugation and while in its initial flat sheet form, with an attendant saving of the time and cost of surface finishing.

An object of the invention is the provision of an improved corrugating method and machine of the character described which are capable of forming highly desirable rectangular and reverse angle corrugations.

Another object of the invention is to provide a corrugating machine which possesses various improved features of construction and operation which uniquely adapt the machine to its intended purposes.

Other objects, features and advantages of the present invention will become apparent to those versed in the art from a consideration of the following description, the appended claims and the accompanying drawings.

Briefly, the objects of the invention are attained by providing a corrugating method and machine wherein each corrugation in a workpiece is formed by gripping the workpiece along two spaced forming surfaces having parallel line elements extending normal to the direction in which the surfaces are spaced, moving a forming die against the workpiece, in the area between the forming surfaces, along a direction line normal to the plane of the workpiece in such a way as to bend the workpiece about each forming surface and the forming die and thereby produce a channel-like corrugation in the workpiece, and simultaneously feeding the forming surfaces and the material of the workpiece, at each side of the forming die, inwardly toward the path of movement of the die, along direction lines in the plane of the workpiece, in such manner that the forming surfaces approach the path of movement of the forming die at a rate proportional to the rate of travel of the die. In this way, the material of the workpiece is, in effect, "gathered" inwardly toward the forming die at a rate which permits the die to indent the workpiece without undesirably drawing, compressing, or otherwise stressing the material of the workpiece in the area being corrugated. Moreover, no relative movement occurs between the workpiece and machine elements in contact with the surface of the workpiece, whereby the workpiece is not abraded, scuffed, scratched, rubbed, or otherwise marred, during the corrugating operation. Accordingly, the present corrugating method and machine are uniquely adapted for operating on sheet material which has been previously painted, anodized, or otherwise coated or surface finished, thereby reducing the cost and fabricating time of the finished corrugated workpiece.

As will appear from the ensuing description, the present corrugating method and machine may be adapted to form corrugations of various cross-sectional configurations. According to the illustrative practice of the invention, for example, the present corrugating method and machine are arranged to form rectangular or reverse angle corrugations. In this case, the forming surfaces and the forming die itself comprise relatively sharp forming edges about which the material of the workpiece is bent to a rectangular or reverse angle cross-section.

The several operating components of the present corrugating machine are operated automatically in timed relation in such manner that the machine is effective to produce a finished corrugated workpiece in minimum time and with minimum effort by the machine operator. While the present method and machine are intended primarily for operating on sheet metal, to form sheet metal panels which are particularly desirable for metal garage doors, mobile homes, prefabricated industrial buildings, and other structures, the invention may be used to advantage with other materials, such as sheet plastic.

A presently preferred corrugating method according to the invention and a presently preferred embodiment of the present corrugating machine are hereinafter described with reference to the attached drawings, wherein:

FIGURE 2 is an enlarged partial side elevational view, taken at line 2—2 in FIGURE 1, showing certain of the machine elements which "gather" the material of the workpiece inwardly toward the forming die during each corrugating operation of the machine;

FIGURE 5 is a diagrammatic illustration of another hydraulic system embodied in the machine of FIGURE 1;

FIGURE 6 is a view taken at line 6—6 of FIGURE 5;

Figure 1:
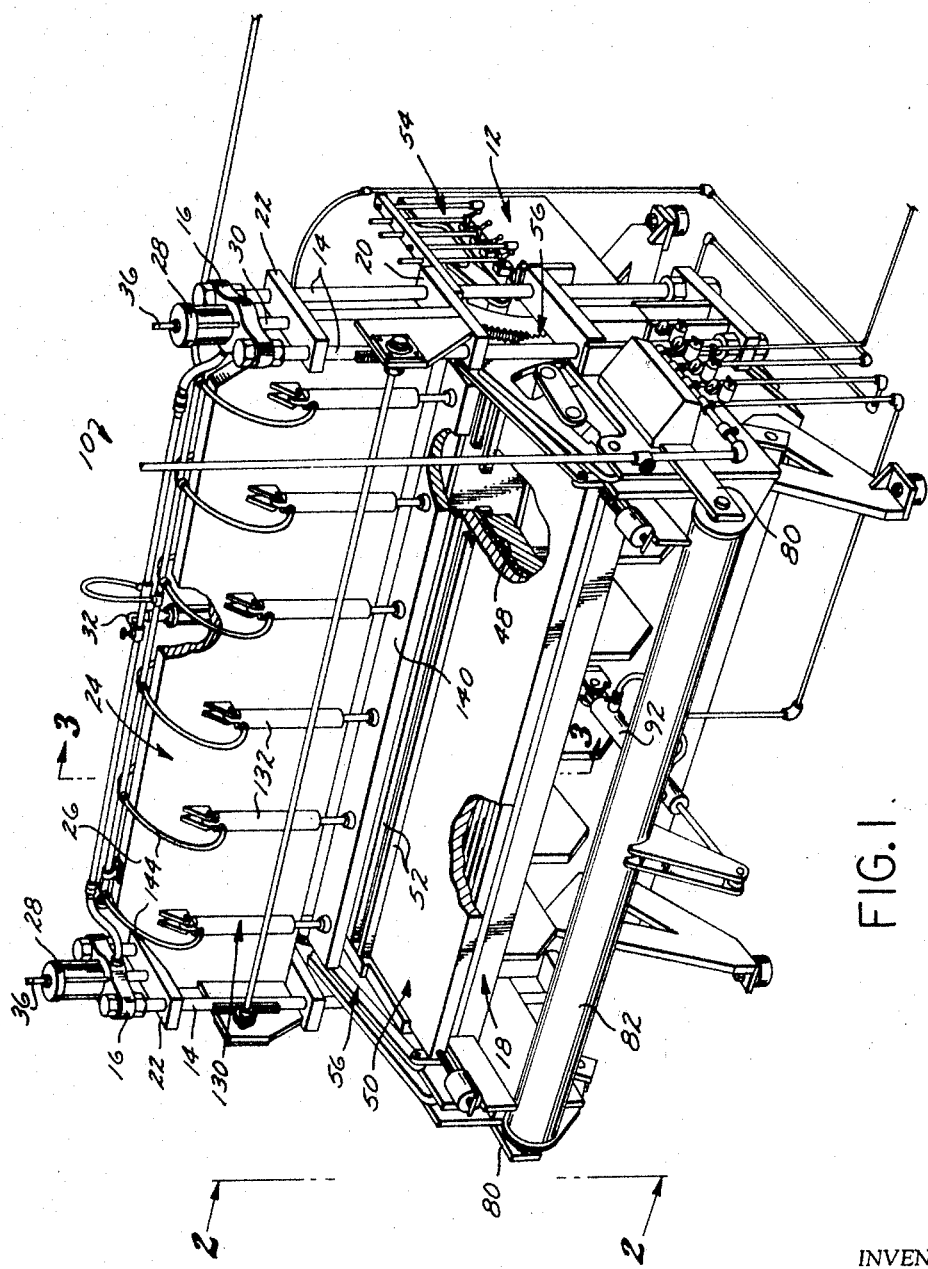
FIGURE 1 is a perspective view, partially broken away and sectioned for purposes of clarity, of a corrugating machine according to the present invention.

Referring to FIGURE 1, the corrugating machine 10 illustrated in these drawings comprises a frame 12 including, at each end, a pair of upstanding rigid guide rods 14 joined at their upper ends by a cross plate 16. Frame 12 also includes a generally horizontal bed 18. The upper ends of the guide rods 14 extend a distance above the frame bed 18. Slidably mounted on the upper ends of each pair of guide rods 14, above the bed 18, are a pair of upper and lower bearing plates 20 and 22, respectively. Between the guide rod pairs 14 is a forming bar assembly 24. This assembly comprises a relatively large, generally flat plate-like forming bar 26 disposed in a vertical plane passing midway between the guide rods 14 of each rod pair. The ends of this bar are reduced somewhat in vertical dimension to fit between the adjacent upper and lower bearing plates 20 and 22. The two bearing plates 20 and 22 of each plate pair are rigidly secured to the adjacent end of the bar 26 in any convenient way. From this description, it is apparent that the forming bar 26 is slidably supported by the guide rods 14 for vertical movement relative to the bed 18 of the machine frame 12.

Figure 4:
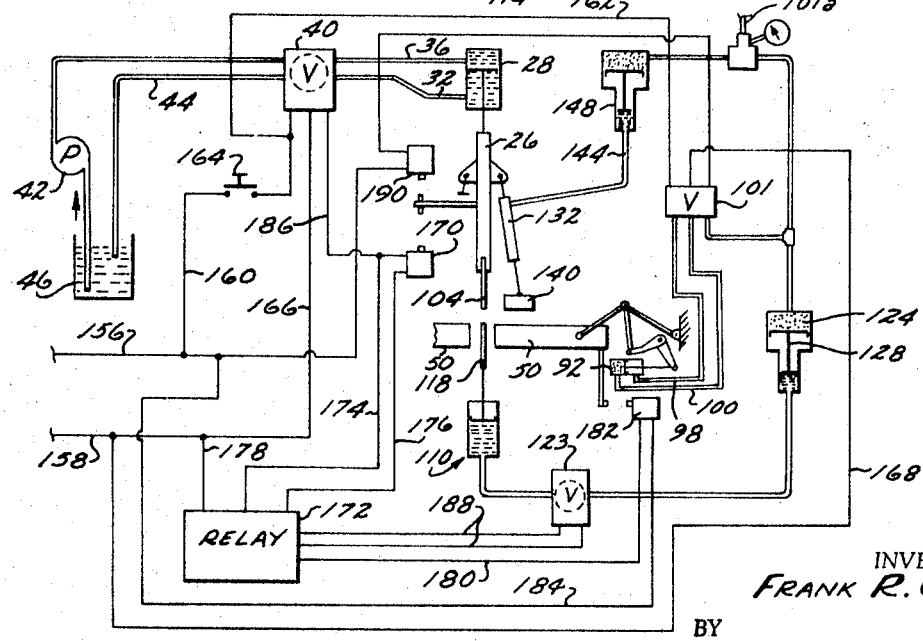
FIGURE 4 is a schematic electrical and hydraulic circuit diagram of the machine of FIGURE 1.

Mounted on the upper connecting plate 16 of each pair of guide rods 14 is a hydraulic cylinder 28 containing a piston (not shown) having a depending piston rod 30 secured to the underlying upper bearing plate 22. Indicated at 32 is a hydraulic supply line which communicates with the cylinders 28, below the pistons therein. Leading from the upper ends of the cylinders 28 is a hydraulic line 36. Referring to FIGURE 4, hydraulic lines 32 and 36 connect to a valve mechanism 40. This valve mechanism is selectively operable to connect either hydraulic line 32 or 36 to a hydraulic pump 42 and the other hydraulic line to a return line 44. The intake of pump 42 and the return line 44 communicate with a hydraulic fluid reservoir 46. It is apparent, therefore, that if the valve 40 is positioned to communicate the hydraulic line 32 to the pump 42 and the hydraulic line 36 to the return line 44, hydraulic fluid under pressure is delivered to the cylinders 28, below the pistons therein, thereby to elevate the forming bar 26 relative to the frame bed 18. If the position of the valve 40 is reversed, hydraulic fluid under pressure is delivered to the upper ends of the cylinders 28, whereby the forming bar 24 descends toward the frame bed 18 under the combined action of gravity and hydraulic fluid pressure in the cylinders 28.

Moveably supported, by means of roller bearings 48, on the frame bed 18 at opposite sides of the vertical plane of the forming bar 26, are a pair of horizontal in-feed plates 50. Bearings 48 support the plates 50 for horizontal movement toward and away from the vertical plane of bar 26. For reasons which will appear shortly, each plate 50 mounts a pair of fixed, upstanding bars 52 which extend parallel to the plane of the forming bar. As discussed earlier, and hereinafter described in greater detail, the material of the workpiece being corrugated is "gathered" inwardly toward the forming bar as the latter descends against the workpiece to form a corrugation. This gathering of the workpiece material is accomplished by the in-feed plates 50. To this end, the plates are driven horizontally in timed relation to the vertical motion of the forming bar.

Horizontal motion of the in-feed plates 50 in timed relation to the vertical motion of the forming bar 26 is accomplished by a reciprocating mechanism 54 (FIG. 2) which is effective to drive the plates in a horizontal back and forth motion, and a cam mechanism 56 (FIGURES 3 and 7–9) which is effective to control the rate of motion of the plates toward the vertical plane of the forming bar. The in-feed plate reciprocating mechanism 54 will be described now. The cam mechanism 56 will be described later.

The in-feed plate reciprocating mechanism 54 comprises a pair of plate drives 56 at opposite ends of the in-feed plates 50. These plate drives are mirror images of one another. Accordingly, a description of one drive will suffice for both drives. One of the plate drives 56, namely that appearing at the left hand side of FIGURE 1, is shown in enlarged detail in, and will be described in connection with FIGURE 2. In this figure, numeral 58 designates a plate which is rigid on the machine frame 12. Plate 58 has upstanding extensions 60. Pivotally mounted on the plate extensions 60 are a pair of meshing sector gears 62. The pivot shafts 64 of the sector gears are disposed substantially in the common horizontal plane of the in-feed plates 50. The sector gears 62 themselves are located at opposite sides of the vertical plane of the forming bar 26 with their circularly curved, toothed edges substantially tangent to opposite sides of the plane. As may be best observed in FIGURE 1, the sector gears 62 of each plate drive 56 are located below the forming bar 26 so as to clear the latter when the assembly is in its raised position shown. As will appear presently, the sector gears rotate downwardly as the bar descends toward the frame bed 18 to produce a corrugation, whereby the sector gears continue to clear the bar throughout the corrugating cycle of the machine.

Returning again to FIGURE 2, each sector gear 62 has a guideway 66 machined therein. Within this guideway is a box 68 containing a screw 70. Screw 70 mounts a right angle journal shaft 72 on which is rotatably supported one end of a link 74. The other end of the link 74 is rotatably mounted on a shaft 76 extending outwardly from the edge of the adjacent in-feed plate 50. Each sector gear 62 has an opening 78 through which the respective pivot shaft 76 extends and which is sufficiently large to permit rotation of the sector gear between the desired limits without encountering the pivot shaft. It is apparent from the preceding description that each sector gear 62, its respective link 74, and respective pivot shafts 64, 72, and 76 form a toggle mechanism which is operative to move the corresponding in-feed plate 50 toward the vertical plane of the forming bar 26 upon downward rotation of the respective sector gear, and to retract the plate away from the plane of the forming bar upon upward rotation of the respective sector gears. The two sector gears 62 of each plate drive 56 mesh with one another and the sector gears of the two plate drives are driven in unison, as described below. The plate drives are thus effective to move the in-feed plates toward and away from the vertical plane of the forming bar in unison in such manner that both plates move toward the latter plane during downward rotation of the sector gears and away from the plane during upward rotation of the sector gears.

The sector gears 62 of the two plate drives 56 are driven in unison, as follows. Rigidly fixed to each sector gear mounting plate 58, and extending horizontally beyond one edge thereof, is a bracket arm 80. Extending between and rotatably supported at its end by the bracket arms 80 is a relatively large tubular shaft 82. Each end of the shaft 82 mounts a rigid, generally radial arm 84. The outer end of each arm 84 is pivotally connected to the adjacent sector gear 62 by a link 86. It is apparent, therefore, that rotation of the shaft 82 in one direction is effective to simultaneously rotate all of the sector gears 62 in the downward direction. Rotation of the shaft 82 in the opposite direction is effective to simultaneously rotate all of the sector gears in the upward direction. Fixed to and extending radially from the center of the shaft 82 is an arm 88. The outer end of this arm is pivotally connected to one end of a piston rod 90, the opposite end of which mounts a piston (not shown) moveable within a cylinder 92. Cylinder 92 is pivotally connected to a bracket 94 rigid on one plate of a pair of depending plates rigid on the machine frame 12.

Leading from one end of the cylinder 92 is an air line 98 and from the opposite end of the cylinder is an air line 100. Referring to FIGURE 4, air lines 98 and 100 connect to a two way valve 101 which receives high pressure air through an air supply line 101a. In one position, valve 101 vents cylinder line 98 and delivers pressure air to cylinder line 100 thereby driving the in-feed plates 50 inwardly. In its other position, valve 101 vents line 100 and delivers pressure air to line 98, thereby retracting the plates outwardly.

Figure 7:
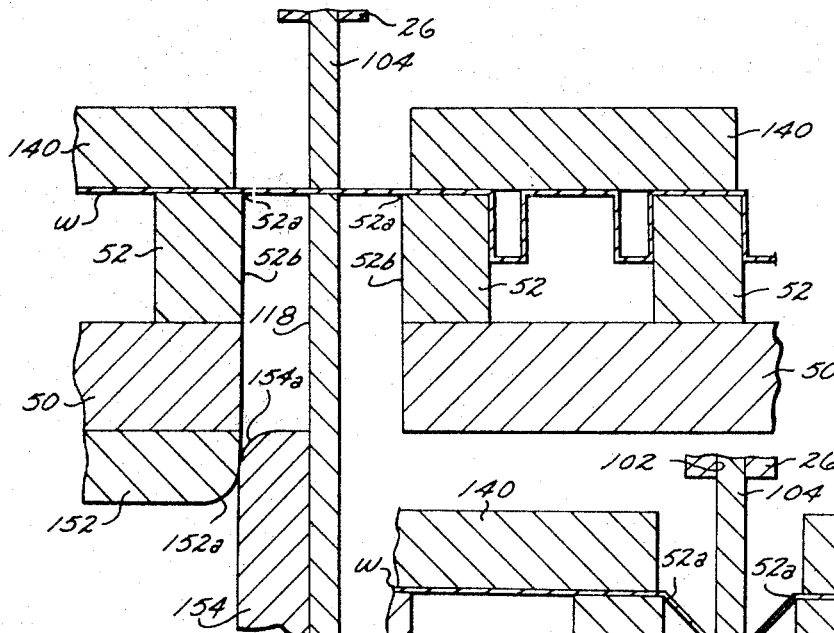
FIGURE 7 illustrates the forming die and certain other elements of the corrugating machine at the outset of one corrugating operation.
Figure 8:
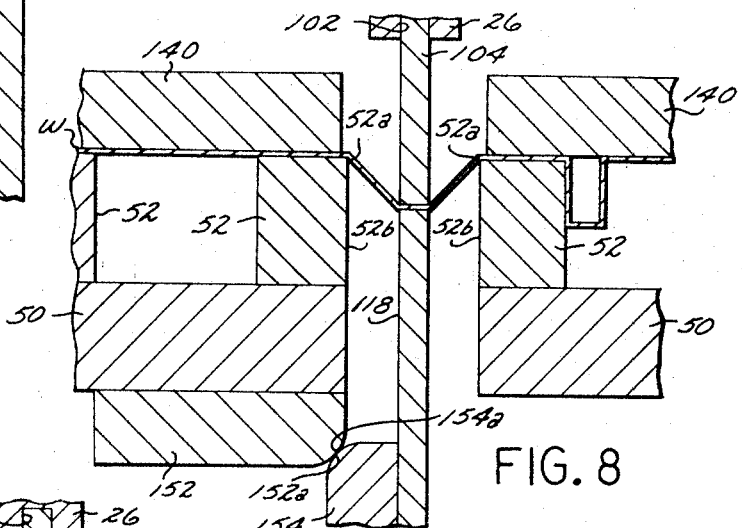
FIGURE 8 is a view of the machine elements in FIGURE 7 at an intermediate stage in the corrugating operation.
Figure 9:
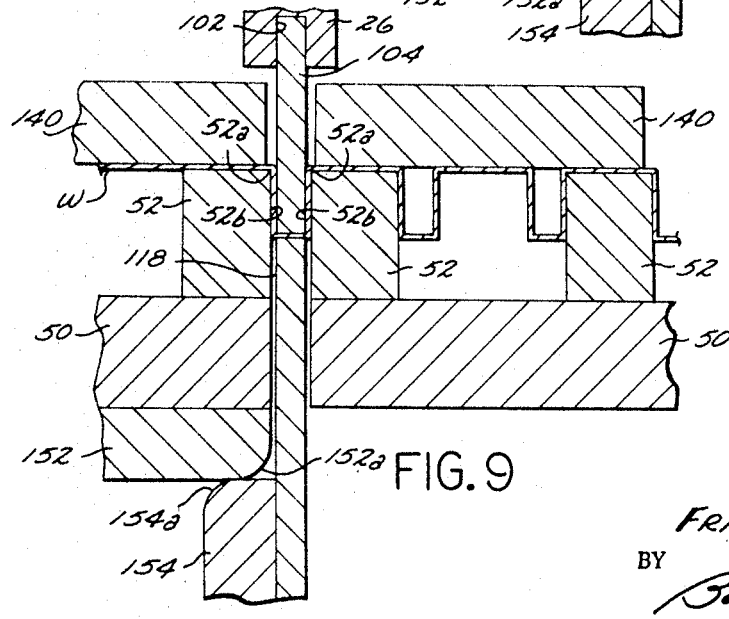
FIGURE 9 is a view of the machine elements in FIGURE 7 at the conclusion of the corrugating operation.

Referring to FIGURES 3 and 7–9, it will be observed that the forming bar 26 has a slot 102 in its lower edge. Fitted in this slot is a forming bar insert 104. In the form of the corrugating machine of the discussion, the forming bar insert 104 is a simple rectangular metal bar. Forming bar insert 104 runs the full length of the forming bar 26 and is releasably retained in the slot 102 of the forming bar by fastener means (not shown). During operation of the corrugating machine, forming bar 26 moves from its upper limiting position of FIGURE 1, through its intermediate positions of FIGURES 7 and 8, to its lower limiting position of FIGURE 9. As the forming bar moves from its position of FIGURE 7 to its position of FIGURE 8, the forming bar insert 104 enters between the in-feed plates 50 to form a corrugation in the workpiece, as illustrated in FIGURES 7 through 9 and hereinafter described.

Figure 3:
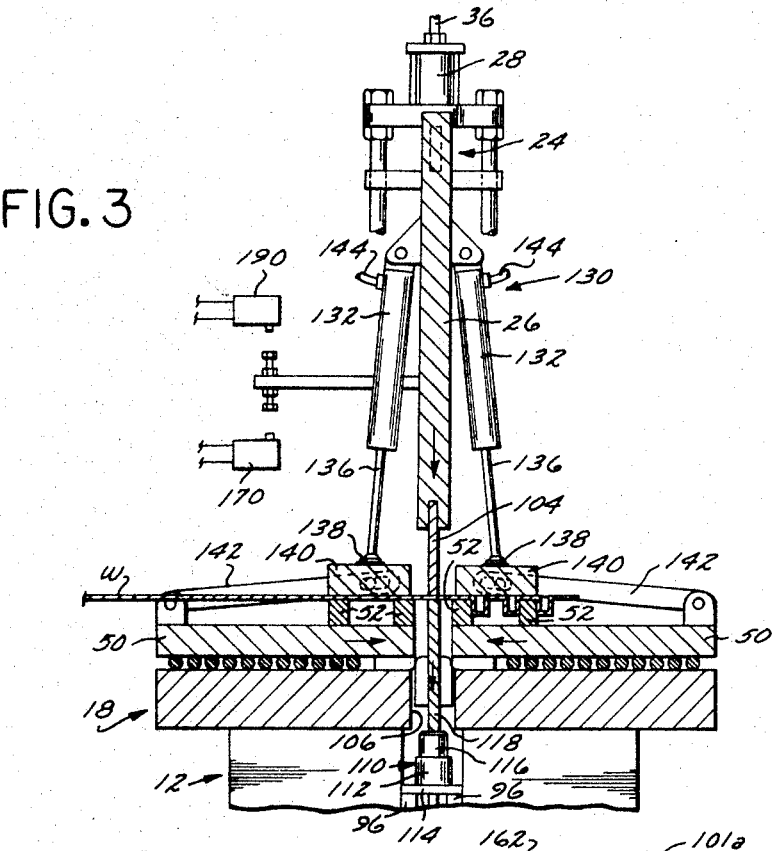
FIGURE 3 is an enlarged sectional view, taken at line 3—3 of FIGURE 1.

As shown best in FIGURE 3, the frame 12 of the corrugating machine 10 has a narrow opening, or slot, 106 in the vertical plane of movement of the forming bar 26. This slot extends through and below the frame bed 18. The depending plates 96, referred to earlier, are fixed within the frame slot 106, below the bed 18. Plates 96 are spaced to define therebetween a narrow space 108. Supported on the upper edges of the plates 96 are a plurality of hydraulic pressure pads 110. Each hydraulic pad includes a cylinder 112 with a base plate 114 which is secured to the plates 96, and the plunger 116 which moves within the respective cylinder 112. Fixed to and supported by the plungers 116 of the hydraulic pads 110 is a pressure bar 118. In the form of the invention of the discussion, this pressure bar comprises a flat rectangular bar of substantially the same thickness as the forming bar insert 104. The forming bar and the pressure bar are disposed in a common vertical plane.

Referring to FIGURES 4, 5 and 6, it will be observed that the cylinders 112 of the hydraulic pads 110 are connected, branch hydraulic lines 120, a header line 122, and a valve 123 to the high pressure side of a hydraulic intensifier 124. The low pressure side of the intensifier 124 is supplied with high pressure air through the air supply line 101a. The force of this pressure air on the piston 128 of the intensifier creates hydraulic pressure in the several hydraulic pads 110 for urging the pressure bar 118 upwardly toward the forming bar insert 104.

Mounted on the forming bar 26 is a work clamping mechanism 130 (FIG. 3). This clamping mechanism is composed of several hydraulic cylinders 132 pivotally mounted at their upper ends on brackets 134 fixed to opposite sides of the forming bar. Each cylinder contains a piston (not shown) having a piston rod 136 extending from the lower end of the respective cylinder 132. The lower ends of the piston rods 136 at each side of the forming head 26 are connected, by swivel couplings 138, to a clamp bar 140. Each clamp bar 140 is substantially coextensive with the forming bar 26, as may be best observed in FIGURE 1. Pivotally attached at one end to each end of each in-feed plate 50 is a link 142. The other ends of the links 142 are pivotally connected to the adjacent ends of the adjacent clamp bar 140. The clamp bars 140 overly the bars 52 on the respective underlying in-feed plates 50. It is apparent, therefore, that the clamping bars 140 are movable toward and away from the underlying plates 50, the clamping bars being guided in their motion toward and away from the plates 50 by the links 142.

Leading from the upper end of each clamp cylinder 132 is a hydraulic line 144. Referring to FIGURES 4, 5 and 6, it will be observed that each hydraulic line 144 connects to header line 146. Header line 146, in turn, is connected to the high pressure side of a hydraulic intensifier 148. The low pressure side of this intensifier is supplied with pressure air from the air supply line 101a.

As noted earlier, the in-feed plate cylinder 92 is effective to produce an hydraulic force for moving the in-feed plates 50 inwardly toward the forming bar 26. As described shortly, this inward stroke of the in-feed plates occurs as the forming bar 26 descends to form a corrugation. Such inward travel of the forming plates is controlled by the cam mechanism 56 in such manner that the position of the in-feed plates at each stage of their inward travel is related to the current vertical position of the descending forming bar. To this end, cam mechanism 56 comprises a horizontally operable cam 152 secured to the underside of one in-feed plate 50 and a vertically operable cam 154 secured to each side of the pressure plate 118. Cam 152 has a rounded corner 152a engageable with a rounded corner 154a of cam 154. Referring to FIGURES 7–9, it will be observed that when the pressure plate 118 is in its upper limiting position, shown at FIGURE 7, the leading edge of the horizontal cam 152 engages the side face of the vertical cam 154. Under these conditions, the in-feed plates 50 are restrained against inward travel toward the forming bar 26. Assume now that the pressure plate descends from its upper limiting position, through the position of FIGURE 8 to the position of FIGURE 9. As the pressure plate thus descends, the hydraulic pressure force which is assumed to be currently active are the plates 50 constantly urges the leading edge of the horizontal cam 152 against the now descending vertical cam 154. Eventually, the vertical cam 154 reaches a position wherein the curved edge 152a on the horizontal cam engages the curved edge 154a on the vertical cam, whereupon the plates 50 are released for inward travel as the pressure plate 118 continues to descend. The inward motion of the in-feed plates increases as the pressure plate descends until finally, upon the pressure plate reaching its position of FIGURE 9, the vertical cam 154 clears the horizontal cam 152, thereby permitting the plates 50 to move inwardly to their inner limiting positions of FIGURE 9.

Referring now to FIGURE 4, numerals 156 and 158 denote two electrical leads through which electrical power is delivered to the corrugating machine. Valves 40 and 101, which are solenoid valves, have terminals connected to power lead 156 through leads 160 and 162 and a switch 164 and other terminals connected to power lead 158 through leads 166 and 168, respectively. When the switch 164 is closed, valve 40 is energized to deliver hydraulic fluid to the upper ends of the forming bar cylinders 28 and to vent the lower ends of these cylinders, thereby to drive the forming bar 26 down, and valve 10′ is energized to deliver pressure air from air line 101a to the in-feed plate cylinder 92, thereby to urge the in-feed plates inwardly toward the now descending forming bar. As noted earlier, however, actual inward movement of the in-feed plates is controlled by the cam mechanism 56 so that the plates do not commence their inward stroke immediately upon energizing of the valve 101 in the manner just explained.

Figure 10:
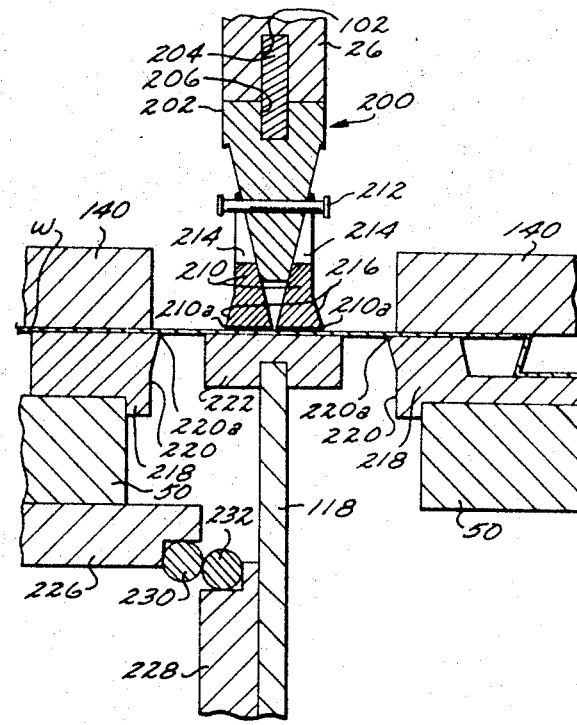
FIGURE 10 is a view similar to the view of FIGURE 7, showing an alternative forming die construction for forming reverse angle corrugations, and illustrating the machine elements at the outset of a corrugating operation.

Forming bar 26 operates a limit switch 170 at the lower limit of its stroke (FIGURE 10). This limit switch is connected to a relay 172 through leads 174 and 176. Relay 172 has a terminal connected to power lead 158 through lead 178 and another terminal connected to power lead 156 through lead 180, a limit switch 182 which is actuated by the in-feed plate 50 at the outer limit of its stroke, and a lead 184. Limit switch 170 is normally open and limit switch 182 is normally closed. Closure of the limit switch 170 by the descending forming bar 26 energizes the relay 172. The relay comprises a holding circuit including the limit switch 182 which locks the relay in energized condition once it is energized by closure of the limit switch 170. Valve 40 has a terminal connected through a lead 186 and lead 174 to the relay. Valve 123, also a solenoid valve, has terminals connected to the relay through leads 188. When the relay 172 is locked in energized condition by closure of the limit switch 170, valve 40 is energized through the relay to reverse the hydraulic connections to the forming bar cylinders 28, thereby to elevate the forming bar 26, and the valve 123, which is normally open, is also energized through the relay and thereby closed to isolate the pressure pads 110 from the hydraulic intensifier 124. When the limit switch 182 is opened by the respective in-feed plate 50 reaching the outer limit of its stroke, the holding circuit for the relay 172 is opened, thereby de-energizing valves 40 and 123.

Forming bar 26 operates an upper limit switch 190 at the upper limit of its stroke. One terminal of this switch is connected to power lead 156. The other terminal of the switch is connected to a terminal of valve 101. Switch 190 is normally open. When the switch is closed by the ascending forming bar 24, valve 101 is energized to reverse the connections to the infeed plate cylinder 92, thereby to retract the in-feed plates 50 outwardly away from the forming bar 26.

Operation of the machine described above is as follows. Assuming that the forming bar 26 is at the upper limit of its stroke and that the in-feed plates 50 are at the outer limits of their stroke, a workpiece W to be corrugated is placed on the upper surfaces of the bars 52 in such manner that the workpiece extends across the region or gap between the confronting inner edges of the in-feed plates. At this time, the clamp bars 140 will be upwardly retracted away from the bars 52 as in FIGURE 1. When the switch 164 is depressed, valves 40 and 92 are energized to commence the downward forming stroke of the forming bar 26 and to urge the in-feed plates 50 inwardly. At some point earlier in the downstroke of the forming bar, and prior to engagement of the forming bar insert 104 with the workpiece, the clamping bars 140 engage the workpiece W to firmly clamp the latter to the bars 52. At this point, the in-feed plates 50 are retained in their outer limiting positions by the in-feed control cams 152, 154. The pressure pad 123 is open so that hydraulic pressure is active in the pressure pads 110 to retain the pressure bar 118 in its upper limiting position of FIGS. 3 and 7, wherein the pressure bar engages the under surface of the workpiece directly below the forming bar insert 104.

Eventually, the forming bar 26 reaches the position of FIGURES 3 and 7 wherein the insert 104 engages the workpiece W in the region between the still retracted in-feed plates 50. As the forming bar continues to descend from the position of FIGURE 7, through its position of FIGURE 8, to its lower limiting position of FIGURE 9, the workpiece W is folded about the confronting inner edges 52a of the innermost bars 52 and about the lower edge of the forming bar insert 104, thereby forming a corrugation in the workpiece, as shown. Thus, the innermost bars 52 serve as forming members which cooperate with the forming bar to produce a corrugation in the work sheet. As the forming bar 26 descends below its position of FIGURE 7 to commence the formation of a corrugation in the workpiece, the pressure bar 118 is forced downwardly by the descending forming bar insert 104 and against the upward thrust of the hydraulic pressure in the pressure pads 110. This hydraulic pressure is set to limit the rate of downward travel of the forming bar 26 in accordance with the thickness of the workpiece W. As the pressure bar 118 is forced downwardly, the vertical in-feed control cam 154 descends to a position wherein its rounded edge 154a engages the rounded edge 152a of the horizontal control cam 152. When this occurs, the pneumatic pressure currently active in the in-feed cylinder 92 becomes effective to move the in-feed plates 50 inwardly, as shown in FIGURES 8 and 9. The material of the workpiece in the region being corrugated, that is in the region between the edges 52a of the bars 52, is thereby gathered, as it were, inwardly toward the forming bar 26 at a rate which is related to the rate at which the material of the workpiece is being depressed by the forming bar insert 104 to form a corrugation. In this way stretching and other undesirable stressing of the workpiece are avoided. Eventually, the in-feed plates 50 reach their inner limiting positions of FIGURE 9, wherein the inner confronting surfaces 52b of the bars 52 abut the side walls of the corrugation produced in the workpiece by the forming bar 26. It is apparent, therefore, that the in-feed bars 52 serve as horizontally movable forming bars which act conjointly with the vertically movable forming bar 26 to produce a corrugation in the workpiece.

When the forming bar 26 reaches its lower limiting position of FIGURE 9, it actuates the lower limit switch 170, thereby reversing the valve 40 to raise the forming bar 26 and closing the valve 123 to hold a fixed pressure in the pressure pads 110. As the forming bar rises, the pressure bars 140 continue to hold the workpiece W against the in-feed bars 52 to enable the forming bar insert 104 to be withdrawn from the now completed corrugation in the workpiece. During the terminal portion of the upward stroke of the forming bar, the plungers 136 of the clamping bar cylinders 132 reach the limit of their outward movement in the cylinders 132, after which the clamping bars 140 rise with the forming bar 26 to disengage the workpiece. Upon reaching the upper limit of its travel, the forming bar 26 actuates the upper limit switch 190 to reopen the pressure pad valve 123 and admit hydraulic fluid from the intensifier 124 to the pressure pads 110. The pressure pads then urge the pressure bar 118 upwardly against the workpiece to elevate the just completed corrugation above the in-feed bars 52 to permit the workpiece to be advanced to the position of the next corrugation. The infeed bars 52 are preferably arranged as shown to locate the workpiece for each succeeding corrugation. Actuation of the upper limit switch 190 also effects outward retraction of the in-feed plates 50 to their outer limiting positions wherein one plate actuates the limit switch 182 to de-energize the relay 172, as explained earlier, and condition the machine for the next corrugating cycle. This cycle is started by depressing the switch 164, as before.

Reference is now made to FIGURES 10 through 13 which illustrate a modification of the machine for forming reverse angle, or dove-tail shaped corrugations. In these figures, the parts of the machine which are identical to those described earlier are indicated by the same reference numerals.

Figure 11:
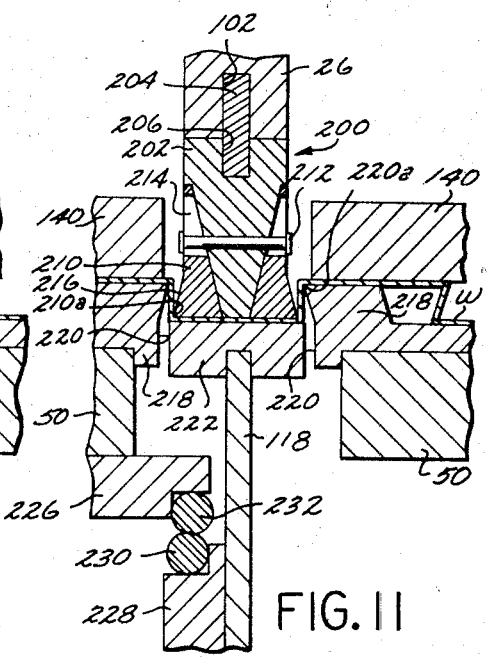
FIGURE 11 is a view of the machine elements in FIGURE 10 at an intermediate stage in the corrugating operation.

In FIGURES 10 through 13, the forming bar insert 104 is removed and replaced by a forming bar assembly 200. This forming bar assembly includes a wedge bar 202 which is located relative to the forming bar 26 by a key 204 which fits within the slot 102 in the forming bar and within a slot 206 in the wedge bar 202. The wedge bar is substantially coextensive with the forming bar 26 and secured to the latter in any convenient way. On opposite sides of the wedge bar are a pair of tapered pressure feet 210. The pressure feet are loosely secured to the wedge bar 202 by cross pins 212 (only one shown) which extend through vertical slots 214 in the pressure feet, whereby the wedge bar and pressure feet are relatively movable. Relative movement of the wedge bar and feet in one direction spreads the feet laterally, as illustrated in FIGURES 10 and 11. Relative movement of the wedge bar and pressure feet in the opposite direction permits the pressure feet to move inwardly toward one another, thereby to reduce the overall transverse dimension of the pressure feet. The pressure feet have inwardly tapered side surfaces 216 which intersect the flat bottom faces of the feet.

The in-feed forming bars 52 on the in-feed plates 50 are replaced by bars 218 having tapered opposing surfaces 220 disposed in planes parallel to the tapered side faces 216, respectively, of the pressure feet 210. Mounted on the pressure bar 118 of the corrugating machine, in FIGURES 10 through 13, is a pressure plate 222. This pressure plate is adapted to support the workpiece W directly under the forming bar assembly 200.

Indicated at 224 in FIGURES 10 through 13 is a cam mechanism for controlling the inward travel of the in-feed plates 50 toward the forming bar assembly 200 during each corrugating cycle of the machine. Cam mechanism 224 comprises a horizontally movable cam 226 fixed to the underside of one forming plate 50 and a vertically movable cam 228 fixed to one side of the pressure bar 118. The horizontal cam includes a roller 230 positioned in a notch in the inner lower edge of the cam. The vertical cam 228 includes a roller 232 positioned in a notch in the upper outer edge of the cam. The cam rollers 230 and 232 engage one another, as shown.

When the modified forming elements of FIGURES 10 through 13 are installed on the corrugating machine 10, the operation of the basic machine remains the same as explained earlier. The forming or corrugating action which occurs during the operation of the machine, however, is somewhat different, as will now be described. During the downstroke of the forming bar 26, the pressure feet 210 of the forming bar assembly 200 eventually engage the workpiece W which is then clamped between the clamp bars 140 and the in-feed bars 218, and are supported from below by the pressure plate 222. Continued downward movement of the forming bar 26 after engagement of the pressure feet 210 with the workpiece W forces the wedge bar 202 of the forming bar assembly 200 between the pressure feet, thereby spreading the feet laterally. At this point, the forming bar assembly 200 is just commencing to exert a downward thrust on the workpiece W.

Figure 12:
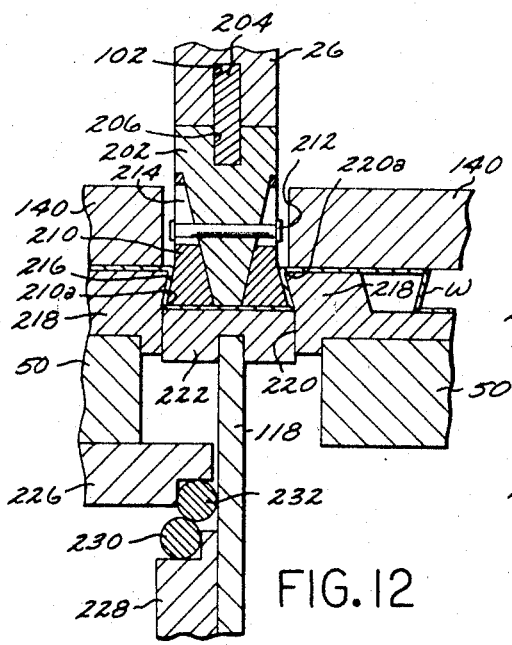
FIGURE 12 is a view of the machine elements in FIGURE 10 at the conclusion of the corrugating operation.

Continued downward movement of the forming bar 26 beyond this position forces the workpiece W downwardly between the opposing surfaces of the in-feed bars 218 and against the pressure plate 222. As described earlier, the upward hydraulic pressure currently active on this plate resists downward movement of the forming bar 26 to control the rate of downward travel of the bar in accordance with the thickness of the workpiece W to be corrugated. At this time, therefore, the pressure plate 222 and the pressure bar 118 commence downward movement with the descending forming bar 26. This downward movement of the pressure bar 118 lowers the vertical cam 228 relative to the horizontal cam 226, thereby permitting the latter and the in-feed plates 50 to move inwardly toward one another under the action of the in-feed plate feed cylinder 92 (not shown in FIGURES 10–13). The workpiece W is thus gathered inwardly toward the descending forming bar 26 at a rate proportional to the rate of downward travel of the bar, as before. As shown in FIGURES 11 and 12, this downward movement of the forming bar 26 and inward movement of the in-feed plates 50 in unison causes bending of the workpiece W about the sharp edges 220a of the in-feed bars 218 and about the sharp edges 210a of the pressure feet 210, thereby to form a corrugation in the workpiece. These corrugating motions of the machine parts continue until the forming bar 26 reaches its lower limiting position of FIGURE 12 and the in-feed plates 50 reach their inner limiting position of that figure. In these limiting positions, the material of the workpiece W is bent flat against the tapered side faces 216 of the pressure feet 210, thereby to form a corrugation of dove-tail or reverse angle configuration.

Figure 13:
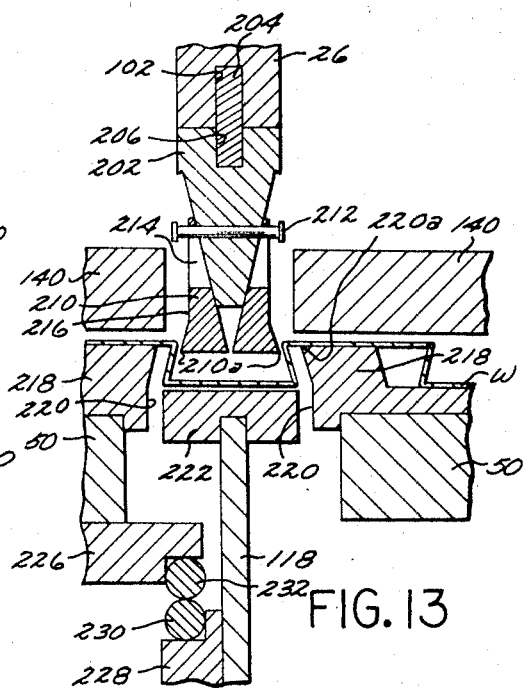
FIGURE 13 is a view of the machine elements of FIGURE 10 showing the forming die and certain other elements being retracted after the conclusion of the corrugating operation.

During the subsequent upward stroke of the forming bar 26, the wedge bar 202 initially moves upward relative to the pressure feet 210. This enables the pressure feet to move inwardly toward one another, to reduce their overall transverse dimension, thereby to permit the forming bar assembly 200 to be withdrawn from the reverse-angle corrugation just formed, as shown in FIGURE 13. The parts of the machine then return to their initial positions to await the start of the next corrugating cycle of the machine, as described earlier.

It will be immediately apparent to those skilled in the art that while forming bar configurations for forming only rectangular and reverse-angle corrugations have been described, the present machine is susceptible of forming corrugations of any desired cross-sectional shape by the utilization of an appropriately designed corrugating structure.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

I claim:

1. A machine for corrugating a normally flat sheet of relatively thin flexible material, comprising a frame, a pair of spaced forming members on said frame including supporting surfaces disposed in a first common plane for supporting the flat sheet in said plane with the sheet extending across the region between the confronting edges of said members, and forming surfaces along said confronting edges joining said supporting surfaces and composed of line elements extending parallel to a second common plane normal to said first plane and passing midway between said forming surfaces, means for clamping said sheet to said supporting surfaces, a forming bar in said second plane and supported on said frame for movement in said latter plane toward and away from said first plane, means for moving said forming bar toward said first plane through a position of initial contact with said sheet in said region, to a limiting position beyond said first plane, thereby to form a corrugation in said sheet, means for urging said forming members inwardly toward said second plane along direction lines parallel to said first plane during movement of said forming bar from said initial position to said limiting position, and means coacting between said forming bar and said forming members for controlling the rate of inward movement of said members toward said second plane during and in response to movement of said forming bar from said initial position to said limiting position.

2. A machine for corrugating a normally flat sheet of relatively thin flexible material, comprising a frame, a pair of spaced forming members on said frame including supporting surfaces disposed in a first common plane for supporting the flat sheet in said plane with the sheet extending across the region between the confronting edges of said members, and forming surfaces along said confronting edges joining said supporting surfaces and composed of line elements extending parallel to a second common plane normal to said first plane and passing midway between said forming surfaces, means for clamping said sheet to said supporting surfaces, a forming bar in said second plane and supported on said frame for movement in said latter plane toward and away from said first plane, means for moving said forming bar toward said first plane through a position of initial contact with said sheet in said region, to a limiting position beyond said first plane, thereby to form a corrugation in said sheet, means for urging said forming members inwardly toward said second plane along direction lines parallel to said first plane during movement of said forming bar from said initial position to said limiting position, and cam means coacting between said forming bar and said forming members for controlling the rate of inward movement of said members toward said second plane during and in response to movement of said forming bar from said initial position to said limiting position.

3. A machine for corrugating a normally flat sheet of relatively thin flexible material, comprising a frame, a pair of spaced forming members on said frame including supporting surfaces disposed in a first common plane for supporting the flat sheet in said plane with the sheet extending across the region between the confronting edges of said members, and forming surfaces along said confronting edges joining said supporting surfaces and composed of line elements extending parallel to a second common plane normal to said first plane and passing midway between said forming surfaces, means for clamping said sheet to said supporting surfaces, a forming bar in said second plane and supported on said frame for movement in the latter plane toward and away from said first plane, means for moving said forming bar toward said first plane through a position of initial contact with said sheet in said region, to a limiting position beyond said first plane, thereby to form a corrugation in the sheet, a pressure bar on said frame between said forming members and at the opposite side of said first plane from said forming bar for yieldably supporting said sheet in said region opposite said forming bar during movement of the latter from said initial position to said limiting position, means for urging said forming members inwardly toward said second plane along direction lines parallel to said first plane during movement of said forming bar from said initial position to said limiting position, and coacting means on said pressure bar and said forming members for controlling the inward movement of said members toward said second plane during and in response to movement of said forming bar from said initial position to said limiting position.

4. A forming machine according to claim 3 wherein said coacting means comprises a first cam on one of said in-feed members and a second cam on said pressure bar engageable with said first cam.

5. A machine for corrugating a normally flat sheet of relatively thin flexible material comprising a frame, a pair of spaced forming members on said frame including supporting surfaces disposed in a first common plane for supporting the flat sheet in said plane with the sheet extending across the region between the confronting edges of said forming members, and forming surfaces along said confronting edges joining said supporting surfaces and composed of line elements extending parallel to a second common plane normal to first said plane and passing midway between said forming surfaces, means for clamping said sheet to said supporting surfaces, a forming bar in said second plane and supported on said frame for movement in said latter plane toward and away from said first plane, means for moving said forming bar toward said first plane through a position of initial contact with said sheet in said region, to a limiting position beyond said first plane, thereby to form a corrugation in the sheet, means supporting said forming members on said frame for inward movement toward said second plane and retraction away from said second plane along direction lines parallel to said first plane, means interconnecting said in-feed members for movement of said members toward and away from said second plane in unison including meshing gears rotatably supported on said frame and toggle means operated by said gears and operatively connected to said forming members, respectively, for moving the latter inwardly toward said second plane in response to rotation of said gears in one direction and outwardly away from said second plane in response to reverse rotation of said gears, and means on said frame operatively connected to one gear for rotating said gears to move said members inwardly toward said second plane during and in timed relation to movement of said forming bar from said initial position to said limiting position.

6. A machne for corrugating a normally flat sheet of relatively thin flexible material, comprising a frame having a horizontal bed, a pair of spaced horizontal in-feed plates mounted on said bed for horizontal movement toward and away from one another, a pair of forming members mounted along the inner edges of said plates including supporting surfaces disposed in a common horizontal plane for supporting the flat sheet in said plane with the sheet extending across the region between said forming members, and inner confronting forming surfaces joining said supporting surfaces and composed of line elements extending parallel to a vertical plane passing midway between said forming members, a forming bar in said vertical plane and supported on said frame for movement in the latter plane toward and away from said horizontal plane, hydraulic means for moving said forming bar in said vertical plane and toward said horizontal plane, through a position of initial contact with said sheet in said region, to a limiting position beyond said horizontal plane, thereby to form a corrugation in the sheet, a hydraulically actuated pressure bar on said frame in said vertical plane below said horizontal plane for supporting said region of said sheet from below and opposing downward movement of said forming bar from said initial position to said limiting position, thereby to regulate the rate of travel of said forming bar between said positions, hydraulic means on said frame for urging said forming plates inwardly during movement of said forming bar between said positions, coacting cam means on said forming plates and pressure bar for regulating the inward movement of said forming plates in response to movement of said forming bar between said positions, and clamping means carried on said forming bar for clamping engagement with said sheet opposite said supporting surfaces during movement of said forming bar between said positions.

7. A corrugating machine according to claim 1, wherein said forming bar has a constant thickness and parallel side surfaces, and said forming surfaces are disposed in parallel planes parallel to the side surfaces of said forming bar.

8. A corrugating machine according to claim 1, wherein said forming bar comprises a tapered wedge bar, a pair of pressure feet slidably interconnected with said wedge bar and having outer tapered surfaces which diverge in the direction of movement of said forming bar from said initial position to said limiting position, and said forming surfaces are disposed parallel to said side surfaces of said pressure feet, respectively.

References Cited

UNITED STATES PATENTS

| | | | |
|---|---|---|---|
| 927,302 | 7/1909 | Walton | 72—399 |
| 1,941,078 | 12/1933 | Eriksson | 72—385 |
| 3,009,510 | 11/1961 | Meshulam | 72—385 |

FOREIGN PATENTS

| | | |
|---|---|---|
| 143,880 | 2/1954 | Sweden. |

OTHER REFERENCES

Australian patent specification No. 246,185, published December 1960, Pelman et al., 72/383.

CHARLES W. LANHAM, Primary Examiner

LOWELL A. LARSON, Assistant Examiner

U.S. Cl. X.R.

72—385